(12) United States Patent
Murthy et al.

(10) Patent No.: US 8,209,352 B2
(45) Date of Patent: *Jun. 26, 2012

(54) METHOD AND MECHANISM FOR EFFICIENT STORAGE AND QUERY OF XML DOCUMENTS BASED ON PATHS

(75) Inventors: Ravi Murthy, Fremont, CA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 531 days.

This patent is subject to a terminal disclaimer.

(21) Appl. No.: 12/352,757

(22) Filed: Jan. 13, 2009

(65) Prior Publication Data

US 2010/0011010 A1  Jan. 14, 2010

Related U.S. Application Data (63) Continuation of application No. 10/763,355, filed on Jan. 23, 2004, now Pat. No. 7,478,100.

(60) Provisional application No. 60/500,450, filed on Sep. 5, 2003.

(51) Int. Cl.
*G06F 17/30* (2006.01)

(52) U.S. Cl. .................. 707/797; 707/769; 715/234

(58) Field of Classification Search .................. 707/803, 707/829, 769, 797; 715/234
See application file for complete search history.

(56) References Cited

U.S. PATENT DOCUMENTS

| | | | |
|---|---|---|---|
| 5,455,945 A | 10/1995 | VanderDrift | |
| 6,662,342 B1 | 12/2003 | Marcy | |
| 6,665,663 B2 | 12/2003 | Lindsay et al. | |
| 6,671,853 B1 | 12/2003 | Burkett et al. | |
| 6,678,672 B1 | 1/2004 | Ramasamy et al. | |
| 6,742,054 B1 | 5/2004 | Upton | |
| 6,799,184 B2 | 9/2004 | Bhatt et al. | |
| 6,832,219 B2* | 12/2004 | Lal ........................................ | 1/1 |
| 7,478,100 B2* | 1/2009 | Murthy et al. ........................ | 1/1 |
| 2001/0029604 A1 | 10/2001 | Dreyband et al. | |
| 2002/0073399 A1 | 6/2002 | Golden | |
| 2002/0143521 A1 | 10/2002 | Call | |
| 2002/0156811 A1 | 10/2002 | Krupa | |
| 2003/0014393 A1 | 1/2003 | Kabra et al. | |
| 2003/0037048 A1 | 2/2003 | Kabra et al. | |
| 2003/0074419 A1 | 4/2003 | VanderDrift | |
| 2003/0101169 A1 | 5/2003 | Bhatt et al. | |

(Continued)

OTHER PUBLICATIONS

Chaudhuri, S. et al., "On Relational Support for XML Publishing: Beyond Sorting and Tagging", Proceedings of the 2003 ACM SIGMOD International Conference on Management of Data, Jun. 2003, ACM Press, USA.

(Continued)

*Primary Examiner* — Cheryl Lewis
(74) *Attorney, Agent, or Firm* — Vista IP Law Group, LLP (57) ABSTRACT

A method, mechanism, and computer program product for storing, accessing, and managing XML data is disclosed. The approach supports efficient evaluation of XPath queries and also improves the performance of data/fragment extraction. The approach can be applied to schema-less documents. The approach is applicable to all database systems and other servers which support storing and managing XML content. In addition, the approach can be applied to store, manage, and retrieve other types of unstructured or semi-structured data in a database system.

38 Claims, 9 Drawing Sheets

U.S. PATENT DOCUMENTS

| | | |
|---|---|---|
| 2003/0233618 A1 | 12/2003 | Wan |
| 2004/0060007 A1 | 3/2004 | Gottlob et al. |
| 2004/0068487 A1 | 4/2004 | Barton et al. |
| 2004/0103105 A1 | 5/2004 | Lindblad et al. |
| 2005/0273703 A1* | 12/2005 | Doughan .................. 715/513 |
| 2005/0278358 A1* | 12/2005 | Doughan .................. 707/100 |

OTHER PUBLICATIONS

Damiani, E. et al., "A Fine-Grained Access Control System for XML Documents", ACM Transactions on Information and System Security (TISSEC), May 2002, pp. 169-202, vol. 5, Issue 2, ACM Press.

DeHaan, D. et al., A Comprehensive XQuery to SQL Translation Using Dynamic Interval Encoding, Proceedings of the 2003 ACM SIGMOD International Conference on Management of Data, Jun. 2003, pp. 623-634, ACM Press, USA.

Fialli et al. "Java Architecture for XML Binding JAXB)" Jan. 8, 2003, Sun Microsystems, pp. 58-74.

Fiebig, T. et al., "Algebraic XML Construction and its Optimization in Natix", World Wide Web, Jan. 2002, pp. 167-187, vol. 3, Issue 4, Kluwer Academic Publishers, The Netherlands.

Flesca, S. et al., "A Query Language for XML Based on Graph Grammars", World Wide Web, Aug. 2002, pp. 125-157, vol. 5, Issue 2, Kluwer Academic Publishers, The Netherlands.

Funderburk, J. et al., "XML Programming with SQUXML and XQuery", IBM Systems Journal, Oct. 2002, pp. 642-665, vol. 41, No. 4, IBM Corporation, USA.

Bruno, N. et al., "Holistic Twig Joins: Optimal XML Pattern Matching". Proceedings of the 2002 ACM SIGMOD International Conference on Management of Data SIGMOD 02, Jun. 2002, pp. 310-321, ACM Press, USA.

Ives, Z. et al., "An XML Query Engine for Network-Bound Data", The VLDB Journal—The International Journal on Very Large Data Bases, Dec. 2002, pp. 380-402, vol. 11, Issue 4, Springer-Verlag New York, Inc., USA.

Jiang, H. et al., "Path Materialization Revisited: An Efficient Storage Model for XML Data", Australian Computer Science Communications, Proceedings of the 13th Australasian Database Conference, Jan. 2002, pp. 85-94, vol. 24, Issue 2, Australian Computer Society, Inc., and the IEEE Computer Society Press, Australia.

Katz, H. et al. "XQuery from the experts: A guide to the W3C XML query language" Aug. 2003, ISBN 0-321-18060-7, publication information pages, copyright information pages, Chapter 6, and Chapter 7, p. 384.

Lee, D. et al., "NeT & CoT: Translating Relational Schemas to XML Schemas Using Semantic Constraints", Proceedings of the 11th International Conference on Information and Knowledge Management, Nov. 2002, pp. 282-291, ACM Press, USA.

Li, C. et al., "Composing XSL Transformations with XML Publishing Views", Proceedings of the 2003 ACM SIGMOD International Conference on Management of Data, Jun. 2003, pp. 515-526, ACM Press. USA.

Li, X. et al., "Compiler Support for Efficient Processing of XML Datasets", Proceedings of the 17th Annual International Conference on Supercomputing, Jun. 2003, pp. 42-52, ACM Press, USA.

Noga et al. "Lazy XML Processing" Nov. 2002, ACM, pp. 88-94.

Papakonstantinou, Y. et al., "QURSEI:i: Querying and Reporting Semistructured Data", Proceedings of the 2002 ACM SIGMOD International Conference on Management of Data SIGMOD '02, Jun. 2002, ACM Press, USA.

Shanmugasundaram, J. et al., "Efficiently Publishing Relational Data as XML Documents", The International Journal on Very Large Data Bases, Sep. 2001, pp. 133-154, vol. 10, Issue 2-3, Springer-Verlag New York, Inc., USA.

Tatarinov, I. et al., "Storing and Querying Ordered XML Using a Relational Database System", Proceedings of the 2002 ACM SIGMOD International Conference on Management of Data SIGMOD '02, Jun. 2002, ACM Press, USA.

Tian et al. "The Design and Performance Evaluation of Alternative XML Storage Strategies" Mar. 2002, pp. 5-10.

Wong, R., "The Extended XQL for Querying and Updating Large XML Databases", Proceedings of the 2001 ACM Symposium on Document Engineering, Nov. 2001, pp. 95-Hi4, ACM Press, USA.

Zhang, X. et al., "Honey, I Shrunk the XQueryl—An XML Algebra Optimization Approach", Proceedings of the 4th International Workshop on Web Information and Data Management, Nov. 2002, pp. 15-22, ACM Press, USA.

Kudrass, T. "Management of XML Documents Without Schema in Relational Database Systems" Information and Software Technology (Mar. 31, 2002) 44(4):269-275.

Yoshikawa, M. et al. "Xrel: A Path-Based Approach to Storage and Retrieval of XML Documents Using Relational Databases" ACM Transactions on Internet Technology (Aug. 2001) 1(1):110-141.

International Search Report dated Dec. 12, 2004 for PCT/US2004/029070.

Written Opinion dated Dec. 12, 2004 for PCT/US2004/029070.

* cited by examiner

```
<a>
 <b id="1">
  <c>foo</c>
 </b>
 <c id="2">
  <d>bar</d>
 </c>
 <b>
  <c>goo</c>
 </b>
</a>
```

| PID | PATH | NODE NAME |
|---|---|---|
| 1 | a. | a |
| 2 | a.b. | b |
| 3 | a.b.@id. | id |
| 4 | a.b.c. | c |
| 5 | a.c. | c |
| 6 | a.c.@id. | id |
| 7 | a.c.d. | d |

FIG. 4

| DOCID | PID | STARTPOS | ENDPOS | NODELVL | NODETYPE | NODEVAL |
|---|---|---|---|---|---|---|
| 1 | 1 | 1 | 19 | 1 | ELEM | |
| 1 | 2 | 2 | 7 | 2 | ELEM | |
| 1 | 3 | 3 | 3 | 3 | ATTR | 1 |
| 1 | 4 | 4 | 6 | 3 | ELEM | |
| 1 | 4 | 5 | 5 | 4 | TEXT | foo |
| 1 | 5 | 8 | 13 | 2 | ELEM | |
| 1 | 6 | 9 | 9 | 3 | ATTR | 2 |
| 1 | 7 | 10 | 12 | 3 | ELEM | |
| 1 | 7 | 11 | 11 | 4 | TEXT | bar |
| 1 | 2 | 14 | 18 | 2 | ELEM | |
| 1 | 4 | 15 | 17 | 3 | ELEM | |
| 1 | 4 | 16 | 16 | 4 | TEXT | goo |

METHOD AND MECHANISM FOR EFFICIENT STORAGE AND QUERY OF XML DOCUMENTS BASED ON PATHS

CROSS-REFERENCE TO RELATED APPLICATIONS

The present application is a continuation of and claims priority to U.S. Ser. No. 10/763,355, now U.S. Pat. No. 7,478,100, filed on Jan. 23, 2004, which claims the benefit of Provisional Application Ser. No. 60/500,450, filed on Sep. 5, 2003, both of which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all copyright rights.

BACKGROUND AND SUMMARY

The extensible markup language (XML) is a meta-language developed and standardized by the World Wide Web Consortium (W3C) that permits use and creation of customized markup languages for different types of documents. XML is a variant of and is based on the Standard Generalized Markup Language (SGML), the international standard meta-language for text markup systems that is also the parent meta-language for the Hyper-Text Markup Language (HTML).

Since its adoption as a standard language, XML has become widely used to describe and implement many kinds of document types. Increasingly greater amounts of content are being created and stored as XML documents in modern computing systems, with the XML documents often being stored in database management systems. Therefore, there is a growing demand for database systems that provide capabilities to store, manage and query XML content natively in a database. As such, mechanisms for efficient storage and querying of arbitrary XML data is becoming important in building a scalable and robust content management platform.

The content of XML documents may be structured or unstructured. Structured data will conform to an XML schema. Unstructured data may not be associated with any specifically identifiable schema. For example, unstructured XML documents may be created as a result of ad hoc editing. As another example, an unstructured XML document may be created by combining multiple structured documents together into an unstructured collection. There are many scenarios in which users need to store and query XML documents that do not conform to any pre-defined XML schemas.

One of the severe limitations of conventional databases that work with XML data is the lack of efficient processing for schema-less XML documents, particularly when attempting to perform XPath processing on these schema-less documents. XPath is a language for addressing parts of an XML document that has been defined by the W3C organization, in which the parts of an XML document are modeled as a tree of nodes. Further information about the XPath language can be found at the W3C website at http://www.w3.org/TR/xpath, the contents of which are incorporated herein by reference in its entirety. Queries involving XPath predicates are often used to filter XML documents and extract fragments within documents.

In many cases, documents that do not conform to an XML Schema can only be stored in CLOB columns. However, this mode of storage impacts the performance of XPath-based searches. Inverted indexes and functional indexes can be used to improve certain types of filter queries. However, the more general form of filter queries which involve range predicates and collection traversals are still not satisfied by such indexes, and hence require inefficient DOM-based evaluation. Moreover, functional indexes can be built only on XPath expressions returning a single value. If the XPath expression returns more than one value, a functional index cannot be created. An inverted list index serves as a primary filter but needs an expensive functional evaluation of the XPath as a post-filter operation. The post-filter step is a significant bottleneck especially for large documents. Finally, neither of the two indexing options are effective in extracting fragments based on user specified XPaths.

Embodiments of the present invention disclose a new approach for storing, accessing, and managing data, such as XML data. Also disclosed are embodiments of new storage formats for string XML data. The approach supports efficient evaluation of XPath queries and also improves the performance of data/fragment extraction, and can be applied to schema-less documents. The invention is applicable to all database systems and other servers which support storing and managing XML content. In addition, the approach can be applied to store, manage, and retrieve other types of unstructured or semi-structured data in a database system.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention. The same or similar elements between figures may be referenced using the same reference numbers.

DETAILED DESCRIPTION

Embodiments of the present invention provide methods, systems, and computer program products for managing, storing, and accessing unstructured and semi-structured data, such as XML documents, in relational and object-relational database systems. For the purpose of explanation, the following description is specifically made with reference to managing, storing, and accessing XML documents in a relational database system. It is noted, however, that the following description is equally applicable to other types of data in other types of storage systems, and is not to be limited in its scope to only XML documents. In addition, the following description explicitly uses query syntax conforming to the structured query language (SQL). It is noted that the following description is also applicable to other types of query languages and syntaxes.

Embodiments of the present invention discloses a new approach for storing, accessing, and managing XML data which supports efficient evaluation of XPath queries and also improves the performance of data/fragment extraction. The approach can be applied to schema-less documents to enable efficient XPath processing. In one embodiment, the approach is similar to name-value pair storage but extended to handle mapping from paths to values—without losing the hierarchical (parent-child) information. Some advantages of this approach include more generic solution to store any XML collection, efficient and/or exact filtering for a large subset of XPath expressions, and more usefulness for extracting fragments based on XPath expressions.

An embodiment provides an efficient mechanism for storing arbitrary XML data (not conforming to any schema) based on paths. This storage mechanism allows for high performance of evaluating a large class of XPath queries including range predicates and collection traversals. These benefits easily outweigh the possible increase in the time to insert the document, e.g., due to the overhead of shredding the document into multiple rows, and to reconstruct the entire document, e.g., due to the extra work in putting together multiple relational rows into a document.

Figure 1:
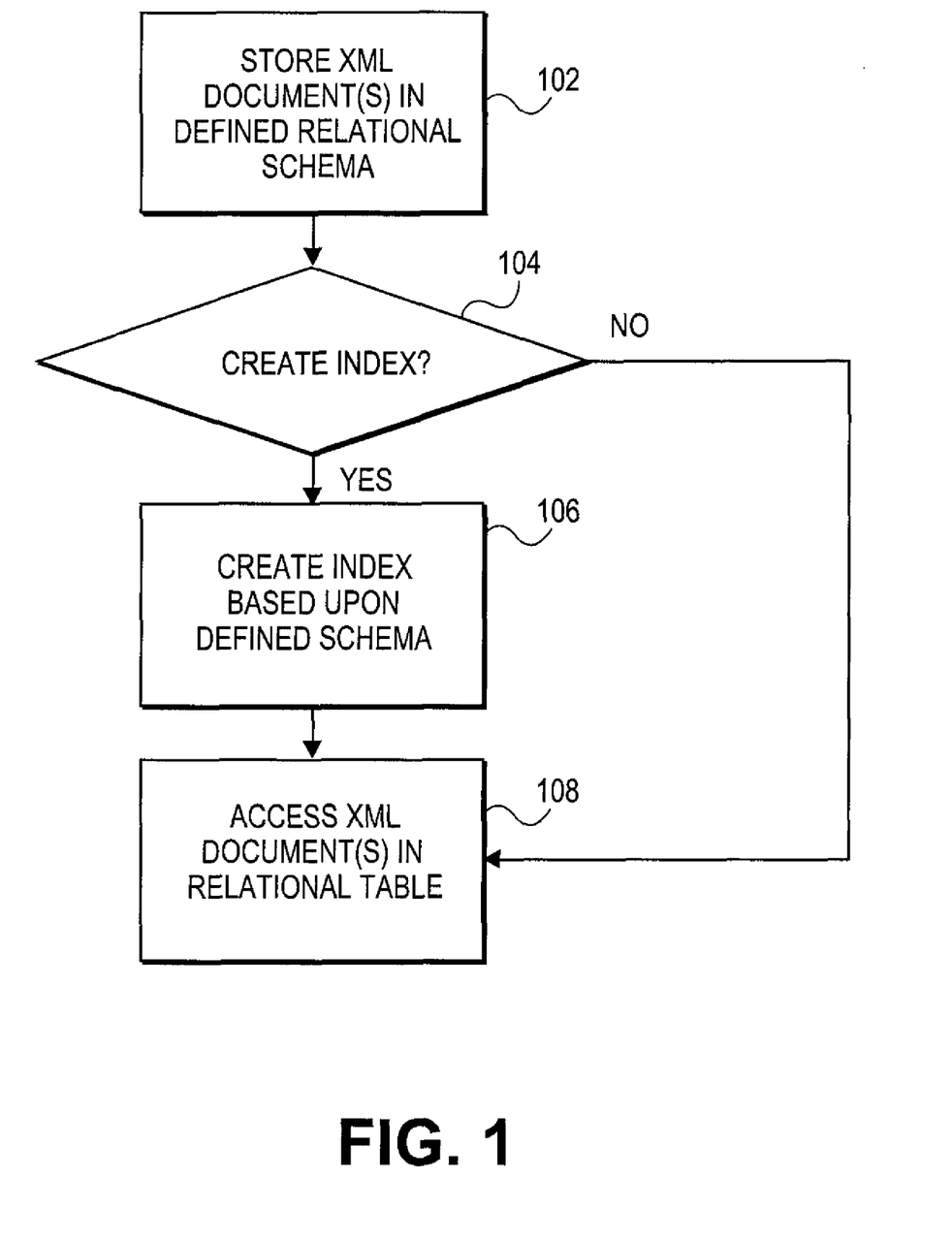
FIG. 1 is a flowchart of a process for managing XML data according to an embodiment of the invention.

As noted, embodiments of the invention provides an approach to define format(s) for storing, accessing, and managing arbitrary XML data comprising sets of documents not conforming to any schema. FIG. 1 is a flowchart showing a high-level overview of a process for storing, accessing, and managing XML documents in a relational database system. At 102, the process begins by storing the XML document(s) into a defined relational schema.

In one approach, the format for storing the XML data can be configured based upon a data model that may be either commonly defined or desirable for processing purposes. For example, in one embodiment, the storage format can be configured to facilitate XPath processing, and therefore the storage format can be defined based upon the tree-of-nodes approach for modeling XML documents that is specified by the XPath standards. At 104, decisions may be made regarding whether to create one or more indexes upon the stored XML data. If so, then the index could be created corresponding to the fields of the defined schema format for storing the XML data (106). Once the XML data has been stored into the desired storage formats, operations can be performed to access the stored XML data (108). Each of these process actions is described in more detail below.

As mentioned above, the format for storing the XML data can be configured based upon a defined data model, such as a storage format that is configured to facilitate XPath processing. Described here is one embodiment of a storage format for storing XML data that is defined based upon the tree-of-nodes approach for modeling XML documents, e.g., as specified by the XPath standards. In this embodiment, any set of arbitrary XML documents, e.g., an XML collection, can be stored in a single (universal) relational schema consisting of two tables. The first table, referred to herein as the PATH_TABLE, stores the path, value pair and associated hierarchical information for the XML data. The second table, referred to herein as the PATH_INDEX_TABLE, assigns unique path ids to path strings, thereby avoiding repeated storage of large path strings. It is noted that the second table is not required, and that the full path can be stored within the PATH_TABLE. However, this approach may be less efficient since it may cause the same large path strings to be repeated multiple times within the table. The following shows an example schema for the PATH_TABLE according to an embodiment of the invention:

| Column Name | Column Type | Description |
| --- | --- | --- |
| DOCID | NUMBER | Unique ID for a document |
| PID | NUMBER | Unique ID for a path (key to PATH_INDEX_TABLE) |
| STARTPOS | NUMBER | Starting position (pre-order number) |
| ENDPOS | NUMBER | Ending position (post-order number) |
| NODELVL | NUMBER | Depth of the node |
| NODETYPE | NUMBER | Type of the node - element/attribute/text/... |
| NODEVAL | VARCHAR2(4000) | Value of the node if attribute/text/... |

In this schema, the DOCID refers to the document identifier that is assigned to the XML documents. Each XML document will have a unique DOCID value. PID refers a unique identifier for a path, which functions as a key into the PATH_INDEX_TABLE. Multiple nodes within an XML document may have the same path, and therefore may be associated with the same PID value. In the present embodiment, a "node" can be defined as specified in the standard XPath specifications from W3C. The STARTPOS entry identifies the starting position of a node and the ENDPOS entry identifies the ending position of that node. Based on pre-order and post-order traversal of the tree of nodes, the NODEVALVL entry identifies the hierarchical level of a node within an XML document. The NODETYPE column identifies the type of the node that is associated with the present entry. Examples of such types could include an element type, attribute type, or text type. In one embodiment, these types are implemented to be similar to the node types defined by the DOM standard. If the node associated with the present entry is associated with a value, e.g., because the node is an attribute or text type, then the NODEVAL column will contain the node value.

The following shows an example schema for the PATH_INDEX_TABLE according to an embodiment of the invention:

| Column Name | Column Type | Description |
| --- | --- | --- |
| PID | NUMBER | Unique ID for the path |
| PATH | VARCHAR2(1400) | Path string |
| NODENAME | VARCHAR2(1000) | Name of terminal node |

Each PID entry identifies a unique path. The PATH column stores the path value that is associated with a PID. The NODENAME column identifies the terminal node for a given path. The NODENAME column can also be defined as a virtual column base upon the PATH column. This type of column is useful while reconstructing the document/fragment to create the appropriate tag names.

Figure 2:
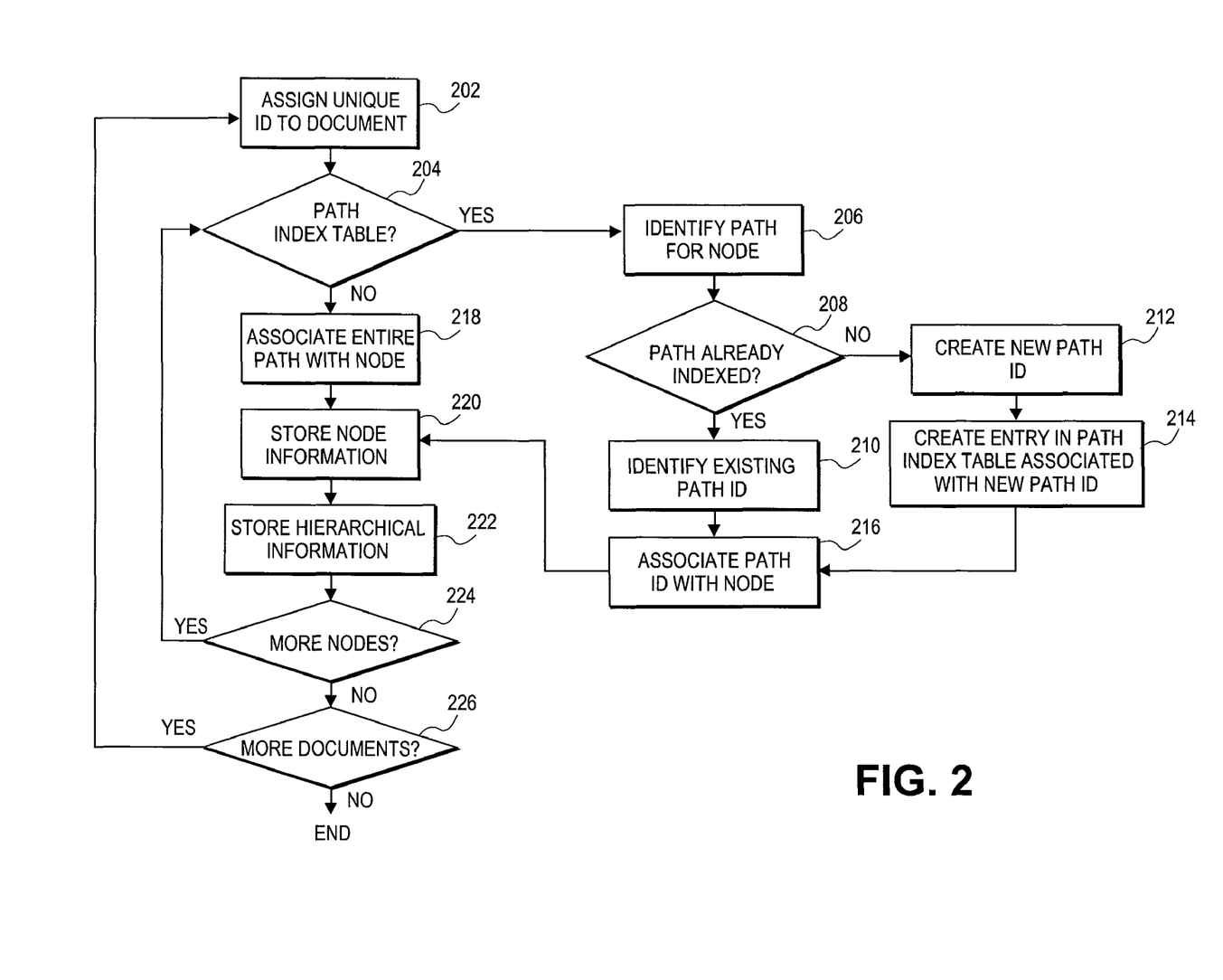
FIG. 2 is a flowchart of a process for storing XML data according to an embodiment of the invention.

FIG. 2 shows a flowchart of an embodiment of a process for storing XML documents into a database using these tables. When an XML document is processed for storage, a unique identifier is assigned to that document, i.e., in the DOCID field. If a separate PATH_INDEX_TABLE is not used, then the entire path for a given node is stored in the PATH_TABLE (218).

If both a PATH_TABLE and a PATH_INDEX_TABLE are used, then the entire path for a node is stored in the PATH_INDEX_TABLE and only a path identifier for that node is stored in the node entry in the PATH_TABLE. In this approach, the path associated with the node is identified at 206. A determination is made whether an entry for the identified path already exists in the PATH_INDEX_TABLE (208). If so, then the identifier for the path is identified (210) and associated with the node (216), i.e., by storing the PID value in the PID column for the node. Otherwise, a new PID value is assigned (212) and a new entry is created in the PATH_INDEX_TABLE for the newly identified path (214). The new PID value is thereafter associated with the node in the PID column of the PATH_TABLE (216).

At 220 and 222, hierarchical information and type/value information for the node is stored in the entry for the node in the PATH_TABLE. The hierarchical information for the XML data is tracked by viewing the XML document as a tree and assigning a start and an end position to each node, e.g., by using pre-order and post-order traversal numbers. In addition, the node level (tree depth) and the node type are stored. Node values are stored for leaf text nodes, attribute nodes, and other nodes that are associated with a value.

At 224, a determination is made whether there are further node(s) to process within the XML document. If so, then the process returns back to 204 to process the next node within the XML document. Otherwise, at 226, a determination is made whether there are further XML document(s) to store in the database. If so, then the process returns back to 202 to process the additional XML documents.

Figure 3A:
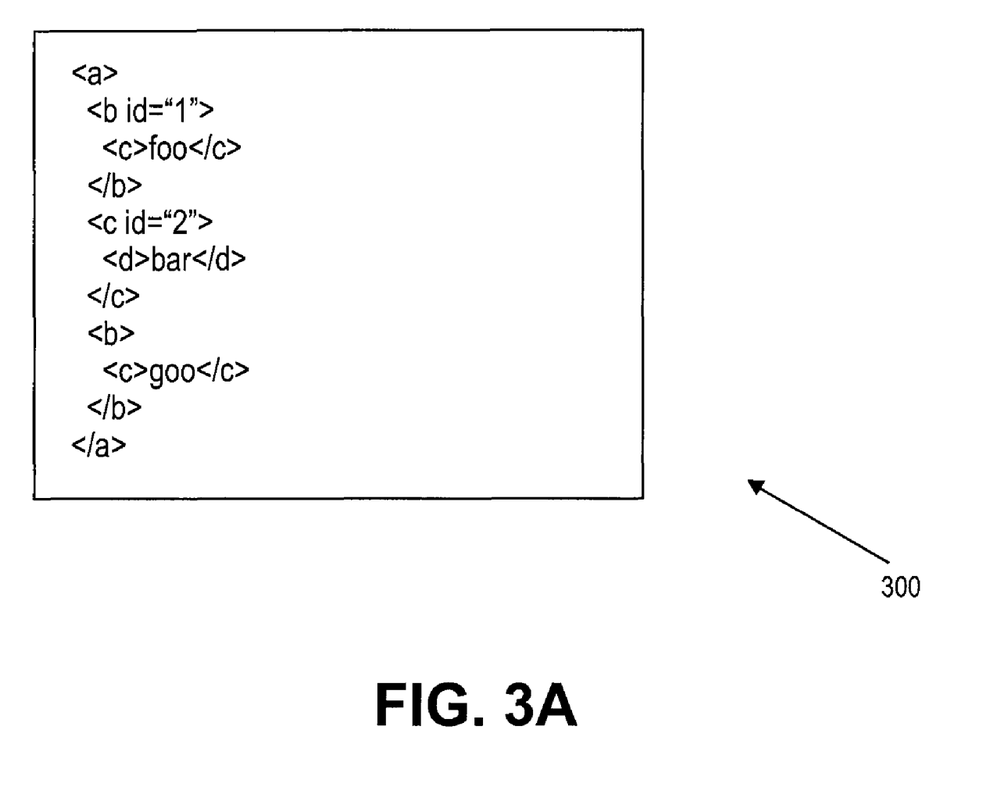
FIGS. 3a-c shows an example XML document.
Figure 3B:
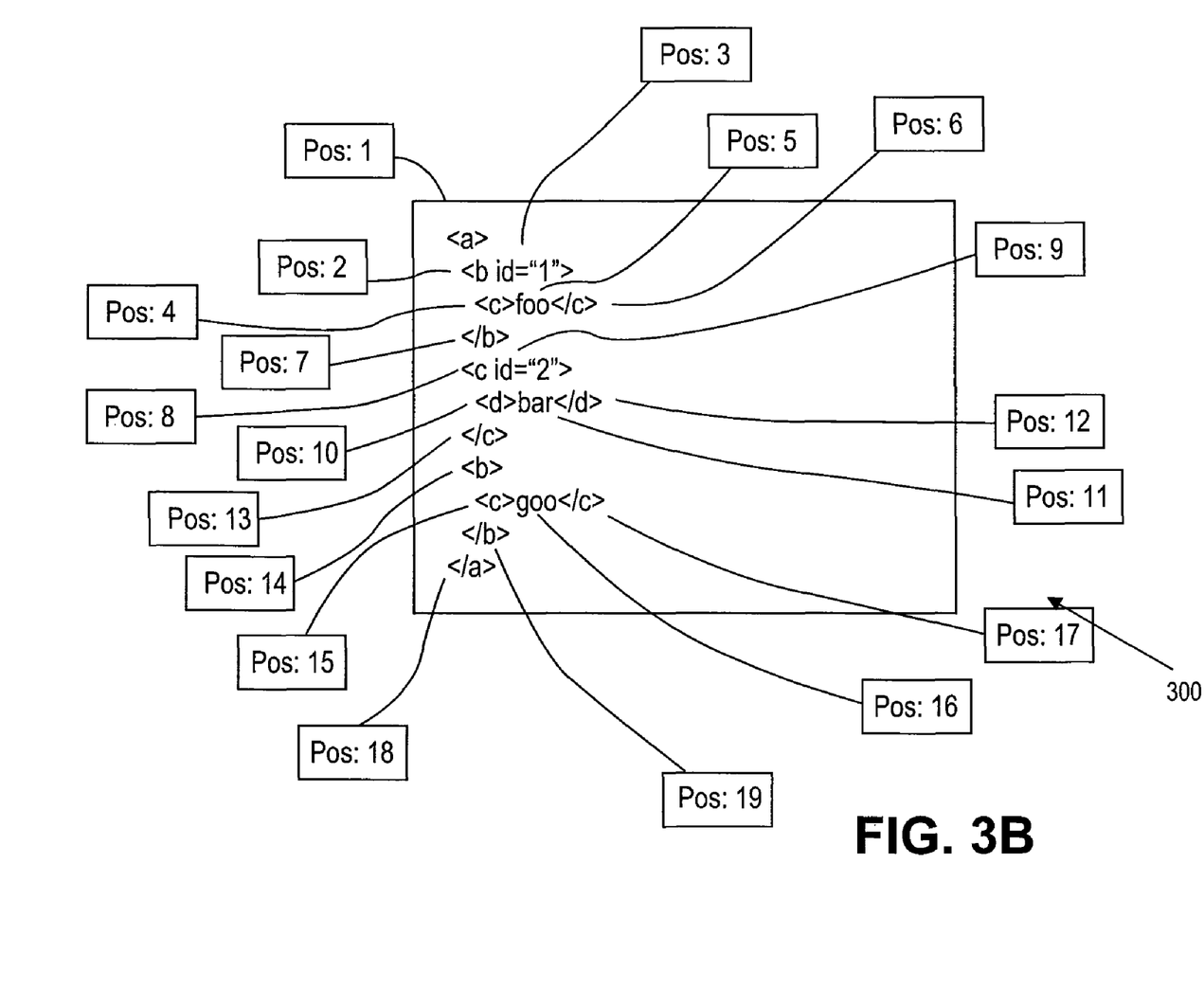
Figure 3C:
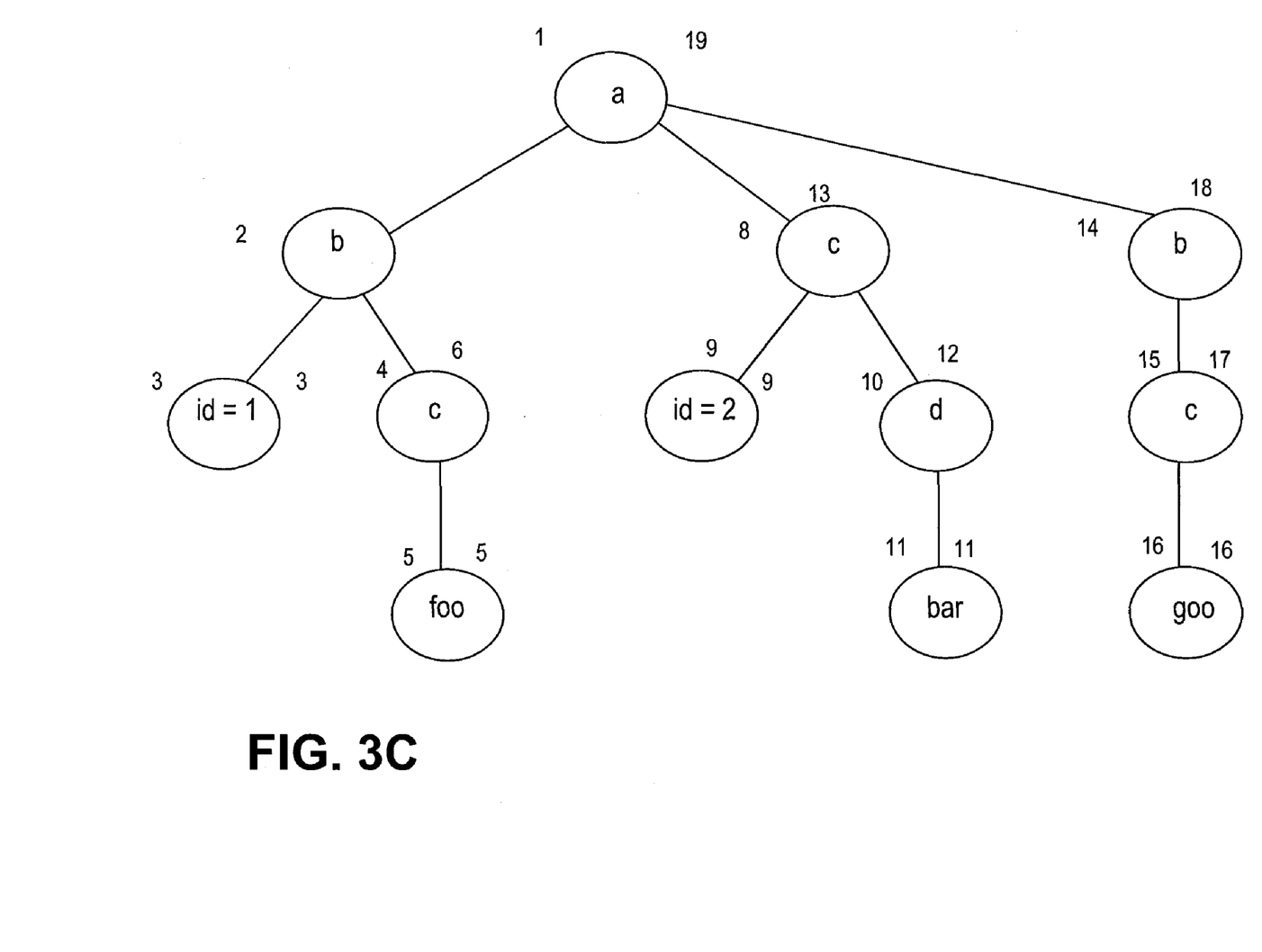

To illustrate this process, consider the example XML document 300 shown in FIG. 3a. A number of different nodes are present in this document. For the purposes of explanation, consider if the start, end, and attribute value portions of each element in the document are assigned to a position number. These position number will then be used to define the relative start positions and end positions for the nodes or fragments in the document. FIG. 3b shows the position numbers for each of the document portions in the example XML document 300. FIG. 3c shows how the position numbers can be defined by identifying pre-order and post-order traversal numbers for a tree model of the document. In this example document 300, element "a" is at the highest level of the document hierarchy and begins at position 1 and ends at position 19.

Figure 5:
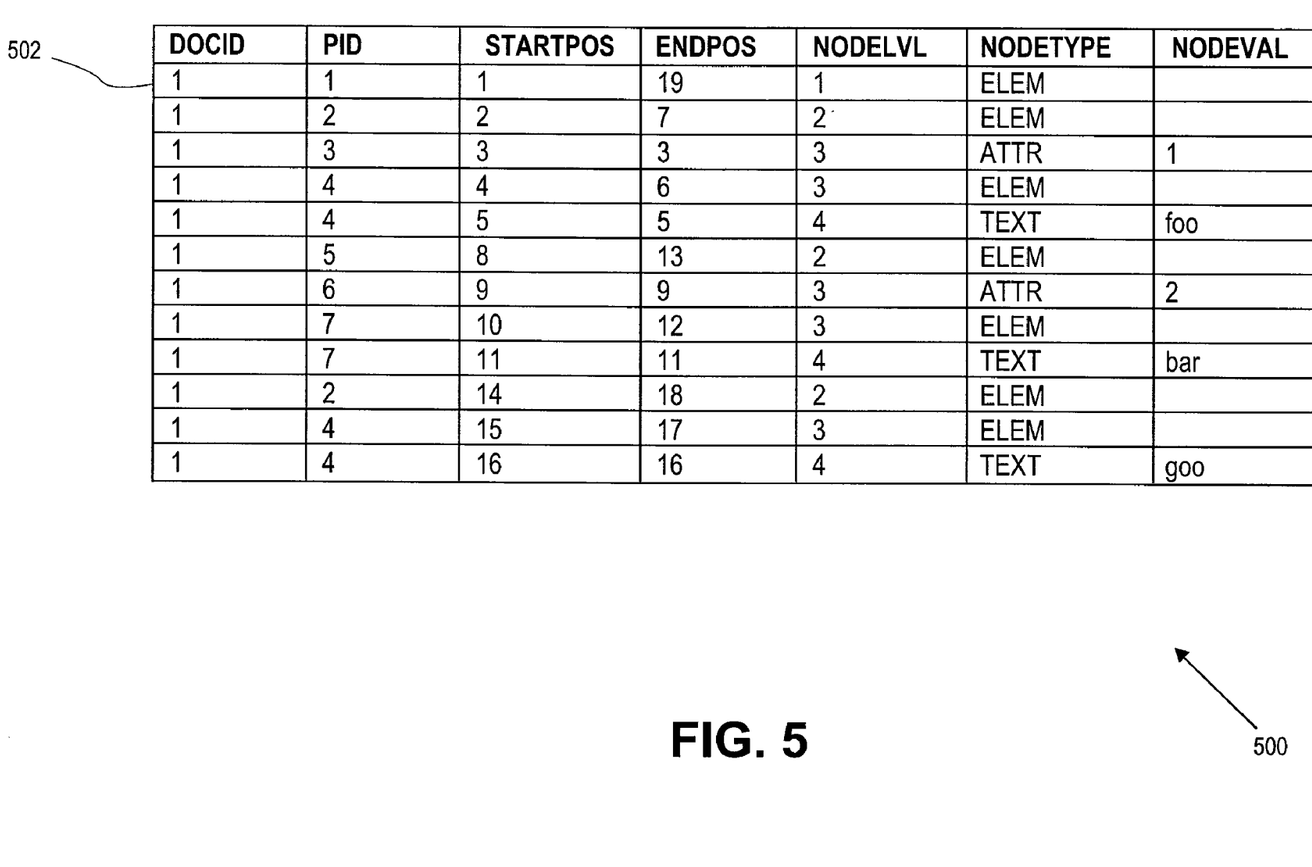
FIG. 5 shows an example Path_Index_Table according to an embodiment of the invention.

FIG. 5 shows an example Path_Table 500 for the XML document 300 of FIGS. 3a-c. Consider the first entry 502 in this table, which corresponds to the "a" element in the document 300. Assume that the DOCID value of "1" has been assigned to the XML document 300. Therefore, the DOCID column of entry 502 contains this value of "1". It is noted that all entries in the Path_Table 500 associated with the same XML document 300 will have the same DOCID value.

Figure 4:
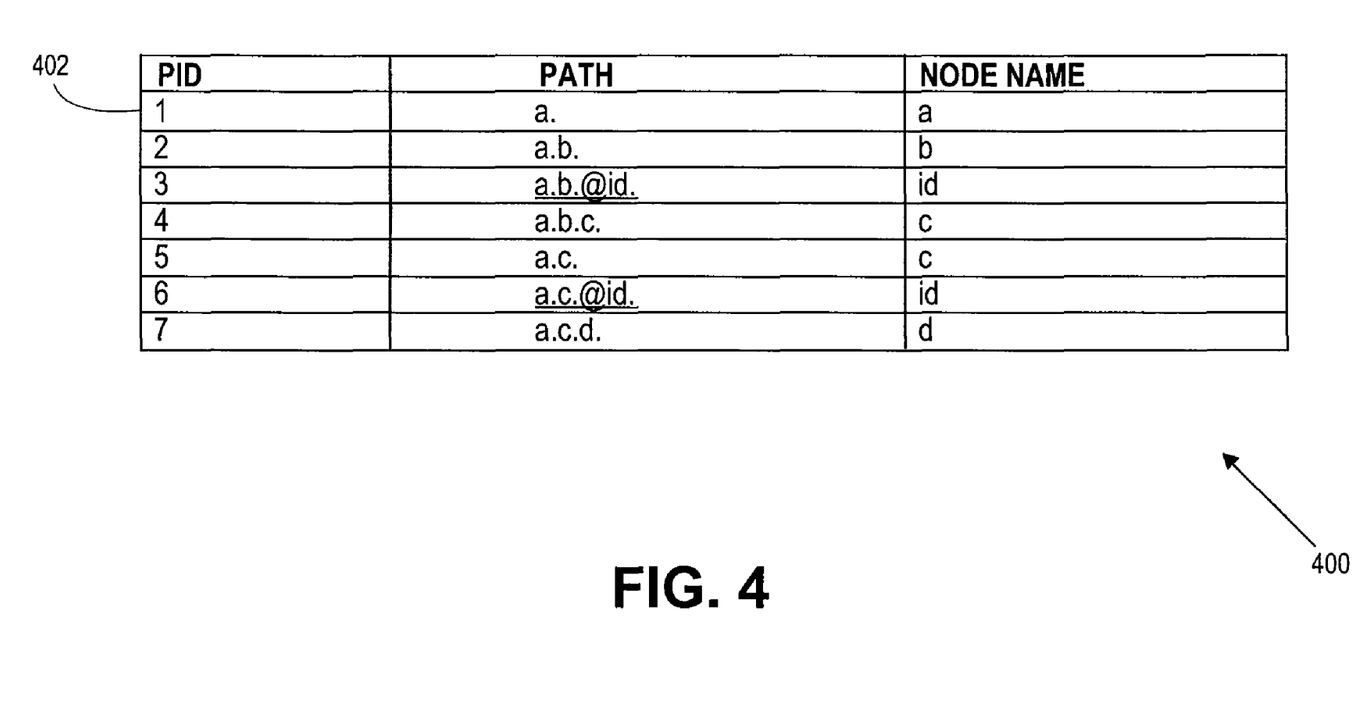
FIG. 4 shows an example Path_Table according to an embodiment of the invention.

The "PID" value provides a key into the Path_Index_Table to find the correct path associated with an entry in the Path_Table 500. For entry 502, the PID value of "1" corresponds to a path of "a.". FIG. 4 shows an example Path_Index_Table 400 that is associated with the XML document of FIG. 3a. Entry 402 in Path_Index_Table 400 includes a PATH column that contains the actual path value associated with the PID. One advantage of having this type of table is that the same pathnames do not have to be repeated over and over again to reference the different nodes in the XML document. Instead, the different nodes can be associated with the appropriate PID in this table to be associated with the correct path within the document.

Referring back to FIG. 5, the "STARTPOS" column for entry 502 identifies the start position for element "a", which is the position of the <a> node. Here, it begins at the first position of the document, hence having a position of "1". The "ENDPOS" value identifies the ending position of the "a" element, which is at the position of the </a> node. Here, it ends at the last position of the document, and when each position in this example document 300 is counted if it is a start node, end node, or attribute node, then the end position for this element is at position 19.

The NODELVL column identifies the hierarchical level of an element. Element "a" is at the highest hierarchical level of the XML document 300, and therefore is associated with a value of "1" in the NODELVL column for entry 502.

The NODETYPE column identifies the type of node that is being stored. Here, entry 502 corresponds to element "a", and therefore the node type stored in the NODETYPE column for entry 502 would be of type "element". The contents within the NODETYPE column can also be stored as numerical equivalents defined for each type, e.g., ELEMENT=1, ATTR=2, TEXT=3, etc.

The NODEVAL column stores the node value, if any, that is associated with the entry. Here, element "a" is not directly associated with a node value. Therefore, the NODEVAL column for entry 502 does not contain a stored value.

The other entries in Path_Table 500 similarly define the other portions of the XML document 300. The other entries in the Path_Index_Table 400 define the other paths that appear in the XML document 300.

One or more indexes can be created on the Path_Table 500 and Path_Index_Table 400 to speed up the evaluation of XPath queries and document and fragment construction operations. For example, to improve the efficiency of the document retrieval and XPath processing, the following are examples of indexes, e.g., Btree indexes, that can be created on the PATH_TABLE 500 in one embodiment of the invention:

pid
    docid, startpos
    docid, nodelvl, startpos
    substr(nodeval, 1, 1400)

The following are examples of indexes that can be created on the PATH_INDEX_TABLE 400 in one embodiment of the invention:

unique index on pid [primary key]
    unique index on (path) reverse Once the XML document has been stored into this type of schema, all or part of the document can be accessed by querying against the known columns of the stored version of the document. In this manner, any of the well-known query methods that have been extensively provided to access relational database tables can be used to efficiently and effectively access XML data stored with this approach. For example, the structured query language (SQL) is a widely adopted mechanism for accessing data stored in a relational database system. The presently described embodiment of the invention provides an approach for allowing SQL to be used to query, access, and reconstruct the stored XML data, even if the XML data was originally unstructured or semi-structured.

A document can be reconstructed very efficiently in a streaming fashion by evaluating the following example SQL query. The query returns all the nodes of the XML document (identified by a docid value) in the document order. Based on the start, end positions and the node level, the appropriate tagging can be added to the output XML stream.

```
select i.nodename, p.startpos, p.endpos, p.nodetype, p.nodeval
from path_table p, path_index_table i
where p.docid = :1 and p.pid = i.pid
order by p.startpos
```

A fragment can be identified by a rowid of the row in the path_table corresponding to the element. Given a rowid of the path_table, the corresponding fragment can be constructed by evaluating the following query. The query returns the nodes within the fragment in document order. Based on the start, end positions and the node level, the output fragment can be constructed.

```
select i.nodename, p.startpos, p.endpos, p.nodetype, p.nodeval
from path_table p, path_index_table i,
    (select docid, startpos, endpos from path_table
      where rowid = :1) p2
where p.docid = p2.docid and p.startpos >= p2.startpos
and p.endpos <= p2.endpos and p.pid = i.pid
order by p.startpos
```

As noted above, one of the current limitations of prior database systems is the lack of efficient XPath processing for schema-less XML documents. The primary syntactic construct in the XPath language is the XPath expression. An XPath expression is evaluated to yield an object, which corresponds to the result of a search upon one or more XML documents.

Figure 6:
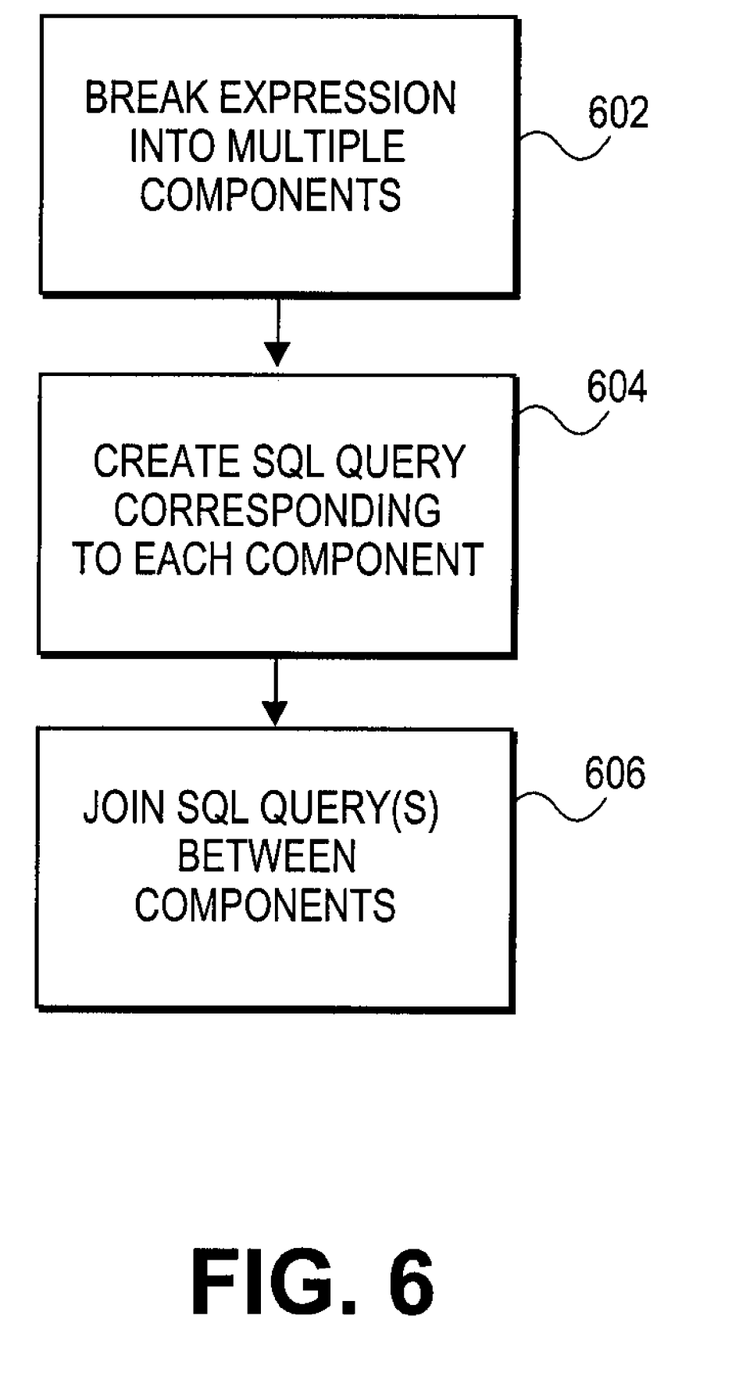
FIG. 6 is a flowchart of a process for converting an XPath expression to a SQL query according to an embodiment of the invention.

Embodiments of the present invention provide an approach for facilitating and enabling XPath processing. This section describes how XPath expressions are translated into queries on the underlying path and index tables corresponding to XML documents stored as described with respect to FIGS. 1-5. Using this approach, any XPath expression can be converted into a SQL query to access the stored XML data. FIG. 6 shows a flowchart of an embodiment of a process for rewriting an XPath expression into a SQL query.

At 602, the process breaks the input XPath expression into multiple components, e.g., using the following rules:

1. Each continuous segment of simple XPath, e.g., a set of node names separated by "/" such as /a/b/c/d, corresponds to a single XPath component. The term "a//b" means any b that is a child of a, but at level of the hierarchy.

2. Each occurrence of a predicate within the XPath causes creation of new components. For example, /a/b [@id="2"]/c/d consists of the following components—/a/b and @id and /a/b/c/d.

At 604, the process creates a SQL query corresponding to each of the XPath components. The SQL query comprises a join of the path_index_table and the path_table and further includes, for example, the following 1. Condition for the path being chosen;

2. Condition for the node type (if needed); and/or

3. Condition for the node value (if present).

At 606, the process joins the SQL query corresponding a component to its previous component using, for example, the following join conditions:

1. Join on the docid (i.e., for the same document); and/or

2. Join on the hierarchy relationship—startpos, endpos (e.g., a parent-child relationship).

The next section of this document describes several examples of the embodiment of the translation techniques to convert an XPath expression into a SQL query.

The following example XPath expression searches for the content(s) of one or more XML fragments corresponding to the location path "/a/b/c/d".

XPath: /a/b/c/d

In the XPath language, a relative location path consists of a sequence of one or more location steps separated by the "/" symbol. The steps in a relative location path are composed together from left to right.

Using the process described above, this XPath expression can be translated to the following SQL statement that queries against the Path_Table and Path_Index_Table:

```
select p1.nodeval
from path_table p1, path_index_table i1
where i1.path = 'a.b.c.d.'
and i1.pid = p1.pid
and p1.nodetype = 3;
```

This query checks for nodes corresponding to the path "a.b.c.d" that also have the appropriate node type to contain a node value (e.g., nodetype="3"), and returns the value of those node(s).

Consider the following XPath expression which contains a "[id=1]" predicate:

XPath: /a/b [id="1"]/c

This XPath expression can be translated to the following SQL statement that queries against the Path_Table and Path_Index_Table:

```
select p3.nodeval
from path_table p1, path_index_table i1,
    path_table p2, path_index_table i2,
    path_table p3, path_index_table i3
where i1.path = 'a.b.'
and i1.pid = p1.pid
and p2.docid = p1.docid
and p2.startpos > p1.startpos
and p2.startpos < p1.endpos
and p2.nodeval = '1'
and p2.pid = i2.pid
and i2.path = 'a.b.@id.'
and p3.docid = p1.docid
and p3.startpos > p1.startpos
and p3.startpos < p1.endpos
and p3.pid = i3.pid
and i3.path ='a.b.c.'
and p3.nodetype = 3;
```

Consider the following XPath expression, which includes the "//" symbol:

XPath: //c

The "//" symbol specifies selection of all the descendents of the document root.

A "like" operator can be used to evaluate this type XPath expression. This following is an example SQL statement that can be used to queries against the Path_Table and Path_Index_Table for this XPath expression:

```
select p1.nodeval
from path_table p1, path_index_table i1
where i1.path like '%c.'
and i1.pid = p1.pid
and p1.nodetype = 3;
```

The following XPath expression combines aspects of the previous three examples:
XPath: /a[//id>"1"]/b/c/d
This XPath expression can be translated to the following SQL statement:

```
select p3.nodeval
from path_table p1, path_index_table i1,
path_table p2, path_index_table i2,
path_table p3, path_index_table i3
where i1.path = 'a.'
and i1.pid = p1.pid
and p1.nodetype = 1
and p2.docid = p1.docid
and p2.nodetype = 3
and p2.nodeval > 1
and p2.pid = i2.pid
and i2.path like '%@id.'
and p3.docid = p1.docid
and p3.startpos > p1.startpos
and p3.startpos < p1.endpos
and p3.pid = i3.pid
and i3.path = 'a.b.c.d.'
and p3.nodetype = 3;
```

System Architecture Overview

Figure 7:
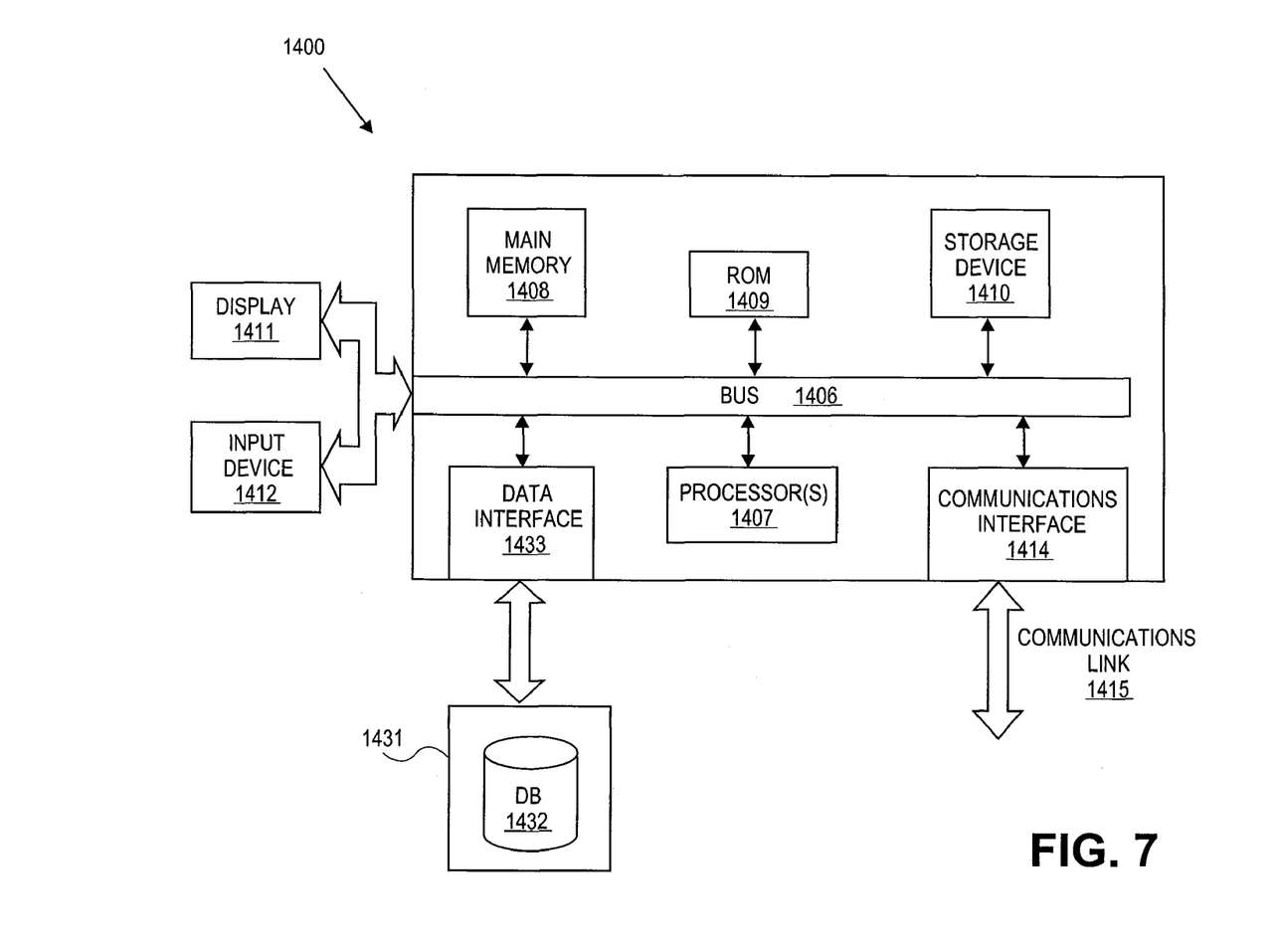
FIG. 7 is a diagram of a computer system with which the present invention can be implemented.

The execution of the sequences of instructions required to practice the invention may be performed in embodiments of the invention by a computer system 1400 as shown in FIG. 7. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 7, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for storing XML data from an XML document into a relational database, comprising:
   identifying a document identifier for an XML document, wherein the XML document comprises a plurality of nodes;
   analyzing the XML document to identify a node by using at least one processor; and
   for the identified node in the XML document, storing path information for the node in a volatile or non-volatile computer usable storage medium, where the path string comprises a full path for the node from a root node of the XML document.

2. The method of claim 1 in which hierarchical information is stored in volatile or non-volatile computer usable storage medium, where the hierarchical information comprises a hierarchical level within the XML document.

3. The method of claim 1 in which node data is stored in the volatile or non-volatile computer usable storage medium, where the node data comprises a node type or node value.

4. The method of claim 1 in which the document identifier is a unique identifier for each different XML document.

5. The method of claim 1 in which the path information is stored in a relational database table.

6. The method of claim 1 in which the path information comprises a path identifier.

7. The method of claim 6 in which the path identifier corresponds to a key to a path entry containing a full path for the node.

8. The method of claim 7 in which the path entry resides in a first table structure and the path information, hierarchical information, and node data reside in a second table structure.

9. The method of claim 7 in which the path entry comprises node name corresponding to a name of a terminal node.

10. The method of claim 1 further comprising:
    maintaining one or more indexes.

11. The method of claim 10 in which the one or more indexes comprise an index on a path identifier, an index on the document identifier and a start position, or an index on the document identifier, start position, and node level.

12. The method of claim 10 in which the path identifier corresponds to a key to a path entry containing a full path for the node, the path entry resides in a separate table, and the one or more indexes comprise an index on path identifiers or a unique index on reverse paths.

13. A computer-implemented structure for storing XML data in a relational database, the computer implemented structure comprising a first table structure, the first table structure comprising:
    a document identifier stored in a volatile or non-volatile computer usable storage medium corresponding to an XML document; and
    a path string for a node within the XML document stored in the volatile or non-volatile computer usable storage medium, wherein the path string comprises a full path for the node from a root node of the XML document.

14. The computer-implemented structure of claim 13 in which the document identifier is a unique identifier for each different XML document.

15. The computer-implemented structure of claim 13 in which the path string comprises a full path for the node.

16. The computer-implemented structure of claim 13 in which the path string comprises a path identifier.

17. A computer implemented method to access a computer-implemented structure for storing XML data in a relational database, the computer implemented structure comprising a first table structure, the first table structure comprising a document identifier corresponding to an XML document and a path string for a node within the XML document, the method comprising:
    generating a SQL query against the computer-implemented structure by using at least one processor; and
    producing a result set based upon executing the SQL query, wherein the path string for a node in the computer implemented structure stored in a volatile or non-volatile computer usable storage medium that is accessed during execution of the SQL query, and wherein the path string comprises a full path for the node from a root node of the XML document.

18. The method of claim 17 in which the SQL query reconstructs the XML document.

19. The method of claim 17 in which the SQL query identifier a fragment within the XML document.

20. The method of claim 19 in which the SQL query corresponds to an XPath expression.

21. The method of claim 20 in which the XPath expression is translated to the SQL query by:
    breaking the XPath expression into multiple components;
    creating a new SQL query corresponding to each of the multiple components; and
    joining the new SQL query corresponding a component to its previous component.

22. A computer program product that includes a non-transitory computer readable storage medium, the non-transitory computer readable storage medium comprising a plurality of computer instructions which, when executed by a processor, cause the processor to execute a process for storing XML data from an XML document into a relational database, the process comprising:
    identifying a document identifier for an XML document, wherein the XML document comprises a plurality of nodes;
    analyzing the XML document to identify a node; and
    for the identified node in the XML document, storing path information for the node in a volatile or non-volatile computer usable storage medium, where the path string comprises a full path for the node from a root node of the XML document.

23. The computer program product of claim 22 in which hierarchical information is stored in volatile or non-volatile computer usable storage medium, where the hierarchical information comprises a hierarchical level within the XML document.

24. The computer program product of claim 22 in which node data is stored in the volatile or non-volatile computer usable storage medium, where the node data comprises a node type or node value.

25. The computer program product of claim 22 in which the document identifier is a unique identifier for each different XML document.

26. The computer program product of claim 22 in which the path information is stored in a relational database table.

27. The computer program product of claim 22 in which the path information comprises a path identifier.

28. The computer program product of claim 27 in which the path identifier corresponds to a key to a path entry containing a full path for the node.

29. The computer program product of claim 28 in which the path entry resides in a first table structure and the path information, hierarchical information, and node data reside in a second table structure.

30. The computer program product of claim 28 in which the path entry comprises node name corresponding to a name of a terminal node.

31. The computer program product of claim 22 further comprising:
    maintaining one or more indexes.

32. The computer program product of claim 31 in which the one or more indexes comprise an index on a path identifier, an index on the document identifier and a start position, or an index on the document identifier, start position, and node level.

33. The computer program product of claim 31 in which the path identifier 20 corresponds to a key to a path entry containing a full path for the node, the path entry resides in a separate table, and the one or more indexes comprise an index on path identifiers or a unique index on reverse paths.

34. A computer program product that includes a non-transitorty computer readable storage medium, the non-transitory computer readable storage medium comprising a plurality of computer instructions which, when executed by a processor, cause the processor to execute a process for accessing a computer-implemented structure for storing XML data in a relational database, the computer implemented structure comprising a first table structure, the first table structure comprising a document identifier corresponding to an XML document and a path string for a node within the XML document, the process comprising:
    generating a SQL query against the computer-implemented structure; and
    producing a result set based upon executing the SQL query, wherein
        the path string for a node in the computer implemented structure stored in a volatile or nonvolatile computer usable storage medium that is accessed during execution of the SQL query, and
        the path string comprises a full path for the node from a root node of the XML document.

35. The computer program product of claim 34 in which the SQL query reconstructs the XML document.

36. The computer program product of claim 34 in which the SQL query identifier a fragment within the XML document.

37. The computer program product of claim 34 in which the SQL query corresponds to an XPath expression.

38. The computer program product of claim 34 in which the XPath expression is translated to the SQL query by:
    breaking the XPath expression into multiple components;
    creating a new SQL query corresponding to each of the multiple components; and
    joining the new SQL query corresponding a component to its previous component.

* * * * *

UNITED STATES PATENT AND TRADEMARK OFFICE
CERTIFICATE OF CORRECTION

PATENT NO.         : 8,209,352 B2
APPLICATION NO.    : 12/352757
DATED              : June 26, 2012
INVENTOR(S)        : Murthy et al.

It is certified that error appears in the above-identified patent and that said Letters Patent is hereby corrected as shown below:

On page 2, in column 1, under "Other Publications", line 8, delete "Binding JAXB)"" and insert -- Binding (JAXB)" --, therefore.

On page 2, in column 2, under "Other Publications", line 13, delete "QURSEI:i:" and insert -- QURSED: --, therefore.

On page 2, in column 2, under "Other Publications", line 29, delete "Hi4," and insert -- 104, --, therefore.

On page 2, in column 2, under "Other Publications", line 30, delete "XQueryI" and insert -- XQuery! --, therefore.

In column 7, line 63, delete "following" and insert -- following: --, therefore.

In column 13, line 34, in Claim 33, delete "identifier 20" and insert -- identifier --, therefore.

In column 14, line 1-2, in Claim 34, delete "non-transitorty" and insert -- non-transitory --, therefore.

In column 14, line 17, in Claim 34, delete "nonvolatile" and insert -- non-volatile --, therefore.

Signed and Sealed this
Ninth Day of October, 2012

David J. Kappos
*Director of the United States Patent and Trademark Office*